(12) United States Patent
Hakobyan et al.

(10) Patent No.: US 12,392,871 B2
(45) Date of Patent: Aug. 19, 2025

(54) RECONSTRUCTION OF ELEVATION INFORMATION FROM RADAR DATA

(71) Applicant: Robert Bosch GmbH, Stuttgart (DE)

(72) Inventors: Gor Hakobyan, Stuttgart (DE); Kilian Rambach, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1160 days.

(21) Appl. No.: 17/147,079

(22) Filed: Jan. 12, 2021

(65) Prior Publication Data

US 2021/0223388 A1    Jul. 22, 2021

(30) Foreign Application Priority Data

Jan. 22, 2020  (DE) .......................... 102020200728.4

(51) Int. Cl.
*G01S 7/41*  (2006.01)
*G01S 13/06*  (2006.01)
*G01S 13/90*  (2006.01)
*G01S 13/931*  (2020.01)

(52) U.S. Cl.
CPC .............. *G01S 7/417* (2013.01); *G01S 13/06* (2013.01); *G01S 13/90* (2013.01); *G01S 13/931* (2013.01)

(58) Field of Classification Search
CPC .......... G01S 7/417; G01S 13/06; G01S 13/90; G01S 13/931
See application file for complete search history.

(56) References Cited

U.S. PATENT DOCUMENTS

| 5,345,539 | A  | * | 9/1994  | Webb ....................... G01S 7/417 342/350 |
| 2018/0203108 | A1 | * | 7/2018  | Nedjar .................. G01S 13/931 |
| 2020/0217950 | A1 | * | 7/2020  | Unnikrishnan ....... G01S 13/931 |
| 2020/0333457 | A1 | * | 10/2020 | Bialer ..................... G01S 7/352 |
| 2020/0348396 | A1 | * | 11/2020 | Bialer ..................... G01S 7/417 |

FOREIGN PATENT DOCUMENTS

GB           2564648 A       1/2019
WO       2017181643 A1     10/2017

OTHER PUBLICATIONS

Neckar, Alex: "CNN Representations Are Lower Dimensional Than You Might Think", (2015), pp. 1-7. URL: http://cs231n.stanford.edu/reports/2015/pdfs/neckar.pdf (accessed on Aug. 17, 2020).
Patel, et al.: "Deep Learning-based Object Classification on Automotive Radar Spectra", IEEE Radar Conference (RadarConf), 2019. pp. 1-6, ISBN 978-1-7281-1679-2.

* cited by examiner

*Primary Examiner* — Matthew M Barker
(74) *Attorney, Agent, or Firm* — NORTON ROSE FULBRIGHT US LLP

(57) ABSTRACT

A method for reconstructing elevation information from measured data that were recorded with the aid of at least one radar device and include a two-dimensional spatial distribution of at least one physical measured variable. The measured data are fed as input variables to at least one generator module that is designed as a neural network. At least one output variable is retrieved from the generator module that represents a measure of the elevation angles from which radar radiation was reflected to the radar device from at least one object. A method for training a generator module, and a method including a complete active chain up to activating a vehicle, are also described.

16 Claims, 5 Drawing Sheets

RECONSTRUCTION OF ELEVATION INFORMATION FROM RADAR DATA

CROSS REFERENCE

The present application claims the benefit under 35 U.S.C. § 119 of German Patent Application No. DE 102020200728.4 filed on Jan. 22, 2020, which is expressly incorporated herein by reference in its entirety.

FIELD

The present invention relates to the evaluation of measured data recorded with the aid of a radar device, in particular a synthetic aperture radar on board a vehicle.

BACKGROUND INFORMATION

For a vehicle to be able to move in an at least semi-automated manner in road traffic, it is necessary for the surroundings of the vehicle to be detected and countermeasures to be initiated, if there is a risk of a collision with an object in the surroundings of the vehicle. It is also necessary for safe automated driving to create a surroundings representation and localization.

The detection of objects with the aid of radar is independent of lighting conditions and also possible at night for greater distances, for example, without the oncoming traffic being blinded by the high beams. However, similarly to optical images, the spatial and angular resolution is diffraction-limited as a result of the interaction between the used wavelength and the physical size of the aperture, from which the radar radiation exits.

To improve the resolution, Great Britain Patent Application No. GB 2 564 648 A describes combining the radar signals measured using different observation angles as a result of the vehicle movement, while observing the surroundings of a moved vehicle with the aid of radar. The combination of the radar signals has a similar effect, as if the surroundings were observed through a long aperture. This is why this technology is also called synthetic aperture radar, SAR.

SUMMARY

In accordance with the present invention, a method is provided for reconstructing elevation information from measured data that were recorded with the aid of at least one radar device.

A radar device uses the spatial arrangement of one or multiple antenna(s), for example in an antenna array, to define a plane, in which an azimuth angle indicates a lateral direction to an object detected with the aid of the radar device. An elevation angle indicates at which height above this plane the object is located or how high an extended object is elevated above this plane. In the case of a radar device on board a vehicle, the plane defined by the spatial arrangement of the antennas may be that plane in which the vehicle is moving.

The measured data include a two-dimensional spatial distribution of at least one physical measured variable. Examples of such measured variables are the intensity of the reflected radar radiation, the radar cross section of objects in the scenery as well as a speed component of objects in the propagation direction of the radar radiation.

Such a two-dimensional spatial distribution originates for example, when measured data are recorded with the aid of a moved synthetic aperture radar device and evaluated in the classic manner. Since a land vehicle is only able to move in the plane, it is not capable of changing through its movement the perspective with regard to the elevation angle observed by the radar device. Without an antenna system that is specifically designed for elevation measurement, only a two-dimensional piece of information is therefore obtained during the evaluation and the elevation angle, from which the radar radiation was reflected back to the radar device in each case, is disregarded. Three-dimensional objects, such as a house, a tree, or a truck, for example, are thus projected in a plane in a distorted manner. In this plane, this results in an additional error in the azimuth angle, under which the objects are detected. Accordingly, the distances from the objects in space are also falsified in the three-dimensional illustration of the scenery in Cartesian coordinates, ascertained from the measured data.

This is where the method comes in. In accordance with an example embodiment of the present invention, the measured data are fed as input variables to at least one generator module that is designed as a neural network. At least one output variable is retrieved from the generator module that represents a measure of the elevation angles from which radar radiation was reflected to the radar device from at least one object.

The projection from the three-dimensional space into a two-dimensional plane may be described mathematically. In such a situation, a common procedure is to formulate the reconstruction as a mathematical problem that is inverse to the projection and to solve same problem. Since only one angle component is detected, the solution to this inverse problem is not known in general and there is a plurality of solutions that are mathematically equivalent. An unambiguous solution may only be found under specific assumptions, for example the elevation angle equals zero. It has been recognized, however, that in the case of objects that are measured at a plurality of points, there is a connection between the sought elevation information and the available two-dimensional spatial distribution of the measured information. This connection is accessible to machine learning.

This means that a limited quantity of training measured data, for which a piece of elevation information is additionally known as the "ground truth," may generally enable the generator module to ascertain the piece of elevation information that is plausible here, starting from a provided two-dimensional spatial distribution. This approach provides various advantages as compared to mathematically inverting the projection.

Machine learning is not confined to a mathematical model of the projection, which as a rule always includes a simplification. Machine learning may rather also automatically detect effects that are not included in such a model and may be potentially, difficult to model, if possible at all.

The approach via machine learning does not result in the tendency in inverting mathematical problems that noise in the entered measured data is considerably intensified and the quality of the reconstruction is impaired.

In the end, any flexibility in this regard depends on what piece of elevation information is specifically requested. In order to enable the generator module to supply a new type of elevation information, the module must be merely retrained mechanically. In contrast thereto, a mathematical model would have to be revised by a human.

In one particularly advantageous embodiment of the present invention, output variables of the generator module indicate, with regard to the locations in the two-dimensional spatial distribution, from which elevation angles radar radiation that contributed to the value of the physical measured variable at the particular location was reflected to the radar device. In this way, a two-dimensional radar image may be converted into an elevation image, for example, in which every pixel value indicates the elevation value (for example, the elevation angle) with regard to the location that represents the corresponding pixel in the radar image. The generator module may be trained particularly well to supply this type of output variables, since numerical elevation angles may be compared particularly comprehensibly to the setpoint elevation angles from the training measured data, for example.

In a further particularly advantageous embodiment, the output variables include a three-dimensional spatial distribution of at least one sought physical measured variable. This distribution may be, for example, a three-dimensional radar image in any arbitrary coordinates, such as in the Cartesian coordinates (x, y, z) or in the polar coordinates (distance, azimuth and elevation), for example. Such a three-dimensional image is to be evaluated particularly comprehensibly with regard to the concrete application, such as the classification of objects in the surroundings of a vehicle, for example. For this purpose, a suitable metric is necessary during training, using which a difference between an image provided by the generator module on the one hand and a setpoint image generated from the "ground truth" for the training measured data on the other hand may be evaluated numerically.

In accordance with an example embodiment of the present invention, the expenditures for memories and computing power for generating the three-dimensional spatial distribution may be reduced in that this task is reduced to multiple partial tasks to be processed in parallel or consecutively. For this purpose, the two-dimensional spatial distribution is divided into multiple segments that are contiguous in each case. For example, an image may be divided into arbitrarily shaped "patches," the decision being left free as to whether and to what extent these "patches" overlap at the edges. For the input variables belonging to each segment (patch), output variables associated thereto are ascertained with the aid of the generator module, i.e., for example, numerical values that are to be assigned to specific points in the three-dimensional space. Accordingly, the generator module may have smaller dimensions. It must merely be capable of processing one "patch" at a time.

All ascertained output variables are combined to obtain the sought three-dimensional spatial distribution of the at least one sought physical measured variable.

An initially empty three-dimensional image may fill, for example, with further numerical values of the sought physical measured variable upon each processing of a further "patch," the entries resulting from a contiguous "patch" not necessarily being located in contiguous segments in the three-dimensional image at all. In this case, numerical values that are already assigned to a specific location may also be subsequently changed by new entries.

The processing in "patches" may be carried out in parallel particularly well on graphics processors (GPUs), for example, which include a plurality of processing units.

In a further particularly advantageous embodiment of the present invention, the generator module includes
 an encoder that translates the input variables into latent variables in a space, whose dimensionality is smaller than the dimensionality of the space of the input variables and smaller than the dimensionality of the space of the output variables, as well as
 a decoder that translates the latent variables into the output variables.

By compressing the input variables to latent variables in a low-dimensional space, the number of the parameters that characterize the behavior of the generator module is considerably reduced. The training is also simplified thereby.

The fact that an encoder-decoder structure is used should not be misunderstood to mean that the generator module is an auto-encoder. In accordance with an example embodiment of the present invention, the generator module does not pursue the objective that the input variables are to be identically reproduced by being translated into latent variables and back-translated into output variables. The input variables are rather to be translated from a first space, in which they do not include elevation information, into a second space, in which elevation information is also present. The "bottle neck" in the form of latent variables is the only thing that the structure has in common with an auto-encoder.

The encoder and the decoder may each be organized in particular in multiple consecutive layers, for example. In this case, the neural network may also include direct connections from a layer of the encoder into a layer of the decoder, for example, which circumvent the space of the latent variables as well as optionally one or multiple further layers of the encoder and/or of the decoder. In this way, specific pieces of information in the layer of the encoder, from which the direct connection originates, may be prevented from being dispensed with during the compression to latent variables. The network then becomes a U-net.

The output variables of the generator module advantageously include multiple two-dimensional spatial distributions of at least one physical measured variable. Each of these distributions then corresponds to an area of elevation angles, from which that portion of the radar radiation that generated the particular distribution was reflected to the radar device. These two-dimensional spatial distributions may be combined particularly comprehensibly to form a three-dimensional spatial distribution of the physical measured variable. When the two-dimensional spatial distributions are present in the coordinates distance and azimuth angle, for example, they may be stacked on top of each other in the coordinate elevation angle, so that a three-dimensional tensor is obtained.

Measured data recorded with the aid of a radar device, whose antenna array does not allow for a direct elevation measurement, are particularly advantageously selected for the described evaluation. When the concrete objective is to detect radar data including elevation information of a specific degree of detail, the path is thus open to initially record the measured data without elevation information with the aid of a constructively simpler and more cost-effective antenna array and to subsequently reconstruct the elevation information with the aid of the generator module. This then in particular saves costs if many identically designed examples of the radar device are to be produced and sold. The training of the generator module must be carried out only once and is then applicable to all identically designed radar devices.

As mentioned above, particularly advantageous measured data are selected that were recorded with the aid of a moved synthetic aperture radar device. In the case of a land vehicle in particular that is only able to move in one plane, the lacking possibility to also change the perspective with regard to the elevation through movement, must then be compensated for through a radar sensor including elevation capability. The radar sensor thus does not need to include additional channels outside of the plane that defines the azimuth angle, for example.

In a further particularly advantageous embodiment of the present invention, the output variables of the generator module are used to evaluate at least one category of a predefined classification of traffic signs, other road users, roadway markings, signaling systems or other traffic-relevant objects in the surroundings of a vehicle and/or at least one position, spatial measurement and/or speed of an object of this type.

This is the most important information that an at least semi-automated vehicle requires to be able, in particular, to become part of a mixed traffic among vehicles controlled by human drivers.

The present invention relates to a method for training a generator module for the use in the previously described method. In accordance with an example embodiment of the present invention, in this method, training measured data recorded with the aid of a radar device, whose antenna array enables a direct elevation measurement, are provided. A two-dimensional spatial distribution of at least one physical measured variable is ascertained from the training measured data as the input variables for the generator module. The two-dimensional spatial distribution is obtained, for example, by reproducing the previously described projection in the two-dimensional plane.

Setpoint output variables are furthermore ascertained from the training measured data. These represent a measure of the elevation angles from which radar radiation was reflected to the radar device from at least one object. Depending on the design of the radar device capable of elevation, it is possible to read the elevation angles directly from the training measured data, for example.

The input variables are processed to output variables with the aid of the generator module to be trained. The generator parameters that characterize the behavior of the generator module are optimized with the objective that the output variables reproduce sufficiently well the setpoint output variables in accordance with a predefined generator cost function.

As elucidated above, the generator module is thus customizable to the radar device to be used in practice, in particular to the used antenna array, and also to the output variables desirable in practice.

In one particularly advantageous embodiment of the present invention, the output variables are additionally fed to a discriminator module designed as a further neural network. Discriminator parameters that characterize the behavior of the discriminator module are trained alternatingly with the generator parameters. The objective of this optimization is that the discriminator module differentiates well the output variables generated by the generator module from setpoint output variables in accordance with a discriminator cost function.

By incorporate the discriminator module, it is ensured that the elevation information generated by the generator module is more realistic. The tendency is thus counteracted that the generator module possibly generates output variables that are indeed close to the setpoint output variables in the sense of the used metric, but are at the same time subject to visible artefacts, for example, that do not occur in this form in any real radar image.

The generator cost function and the discriminator cost function may be in particular combined to form an overall cost function, for example, for the combined training of the generator module and of the discriminator module, so that the value of the overall cost function is improved, if the output variables approach the setpoint output variables, but become worse, if the discriminator module is capable of differentiating these output variables well from the real setpoint output variables.

During the training, there is thus a constant "competition" between the generator module and the discriminator module. The arrangement from the generator module and the discriminator module is therefore a generative adversarial network, GAN. In this case, the generator module generates the elevation information, no matter in what form, under the boundary condition that it refers to the same scenery that is represented by the input variables (for example the distorted two-dimensional radar image). This means that no three-dimensional radar image is generated, for example, that is very realistic per se, but does not fully correspond to the scenery in question. Due to this boundary condition, the arrangement is thus a "conditional GAN," CGAN. During training, the discriminator module should thus also be provided with those input variables, on whose basis the generator module functions.

A radar device is selected that includes multiple channels outside of the plane, in which its azimuth angle is defined, for the purpose of recording the training measured data. The training measured data may then be separated particularly comprehensibly into input variables of a type such as the one that would also be obtained in the case of an elevation-incapable measurement, and additional information on elevation that are only available during the training. For example, the input variables may be formed from the measured data of only one channel of the radar device, while the measured data of all channels are incorporated into the formation of the setpoint output variables.

In a further particularly advantageous embodiment of the present invention, a distance relative speed spectrum of the particular training measured data is ascertained for each channel. The input variables for the generator module and the setpoint output variables are ascertained from the distance relative speed spectra. For this purpose, an angle estimation of an elevation angle, which in turn is a function of the azimuth angle and of the elevation angle, may be ascertained for example for each pair that is included in such a spectrum and is formed from a distance and a relative speed. The azimuth angle and the elevation angle may thus then be computed from the relative speed in connection with the elevation angle.

The present invention also relates to a further method that completes the active chain up to activating a vehicle.

In accordance with an example embodiment of the present invention, in the case of this method, a generator module is initially trained using the previously described training method. Measured data are recorded from the surroundings of the vehicle with the aid of at least one radar device that is mounted at or in a vehicle. Elevation information is reconstructed from the measured data with the aid of the method described at the outset. An activation signal is formed by using this elevation information. The vehicle is activated using the activation signal.

As elucidated above, reconstructing the elevation information has the effect that the measured data may be interpreted in a more relevant manner with regard to the traffic situation, in which the vehicle is located. In particular, the sizes of objects as well as the distances between the objects are ascertained more accurately. A shadow cast by an object brought about by an elevation angle that is different from zero is thus not misinterpreted in the radar image as a physically present object. The probability of the vehicle activated using the activation signal that results in a response from the vehicle that is appropriate to the traffic situation is thus increased overall.

As elucidated above, the result of the training of the generator module is embodied in the generator parameters. Anyone who owns these generator parameters may enable a generator module to supplement the measured data of a concrete elevation-incapable radar device with elevation information even without previous training. The generator parameters are therefore a discrete product salable for the customer's benefit. The present invention therefore also relates to a parameter set including the generator parameters that are obtained by training a generator module with the aid of the previously described training method.

The methods may be implemented by a computer completely or partially, in particular. The present invention therefore also relates to a computer program including machine-readable instructions that, if carried out on one or multiple computer(s), prompt the computer(s) to carry out one of the above-described methods. In this sense, control units for vehicles and embedded systems for technical devices that are also capable of carrying out machine-readable instructions, are also to be regarded as computers.

The present invention also relates to a machine-readable data carrier and/or to a download product including the parameter set and/or including the computer program. A download product is a digital product that is transferrable via a data network, i.e., is downloadable by a user of the data network, and that may be offered for sale for instant download in an online store, for example.

Furthermore, in accordance with example embodiments of the present invention, a computer may be equipped with the parameter set, the computer program, the machine-readable data carrier or the download product.

Other measures which enhance the present invention are illustrated in greater detail below based on the figures together with the description of the preferred exemplary embodiments of the present invention.

DETAILED DESCRIPTION OF EXAMPLE EMBODIMENTS

Figure 1:
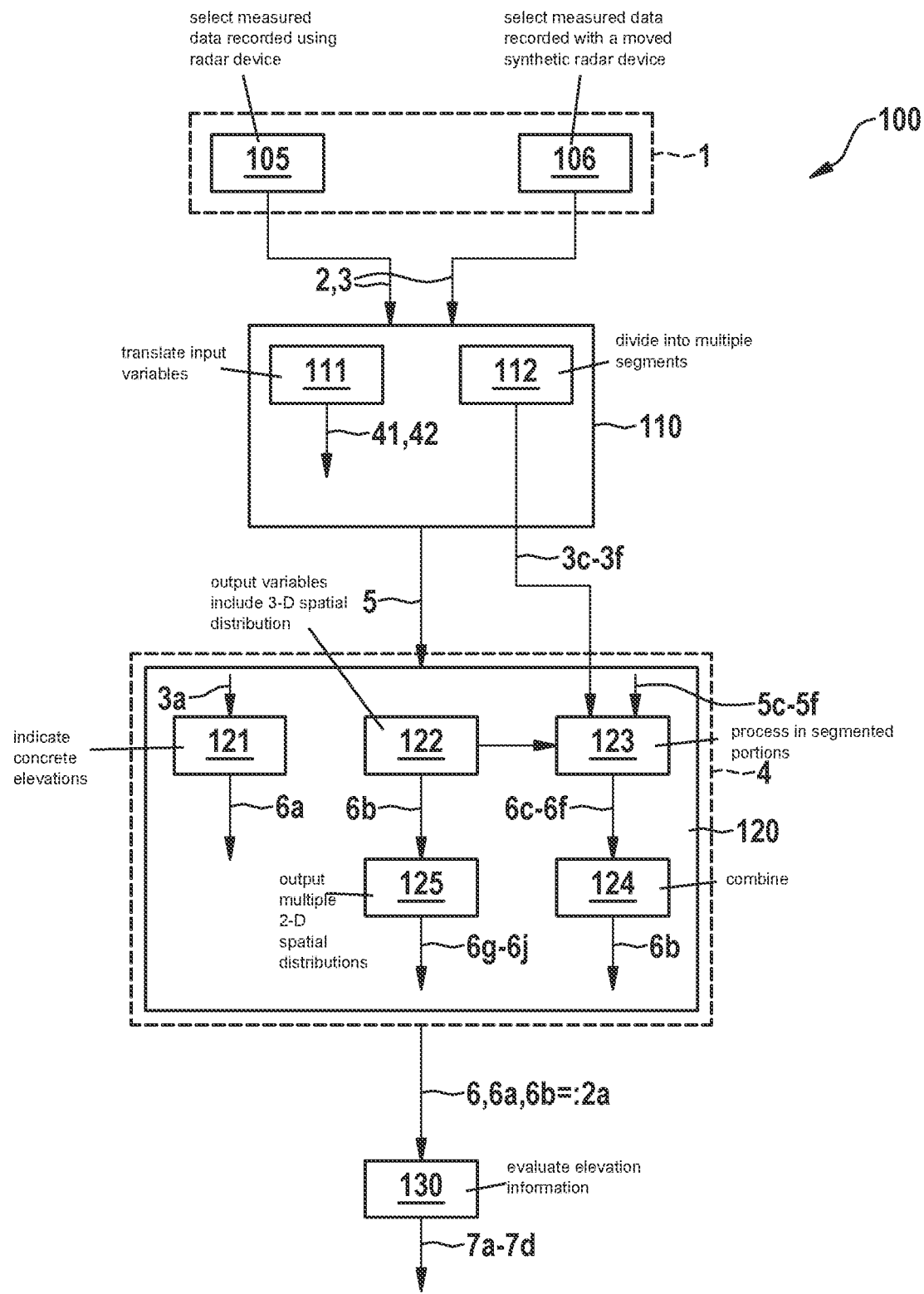
FIG. 1 shows one exemplary embodiment of method 100 for reconstructing elevation information 2a from measured data 2, in accordance with the present invention.

FIG. 1 is a schematic flowchart of method 100 for reconstructing elevation information 2a from measured data 2 recorded with the aid of at least one radar device 1. In step 110, measured data 2, which include a spatial distribution 3 of at least one physical measured variable, are fed to at least one generator module 4 as input variables 5. In step 120, at least one output variable 6 is retrieved from generator module 4 that represents a measure of the elevation angles 6a from which radar radiation was reflected to radar device 1 from at least one object. In other words, at least one output variable 6 includes elevation information 2a. According to block 121, output variables 6 of generator module 4 indicate in particular with regard to locations 3a in spatial distribution 3, from which concrete elevation angles 6a radar radiation that contributed to the value of the physical measured variable at particular location 3a was reflected to radar device 1.

Elevation information 2a is further evaluated in step 130, to ascertain at least one category 7a of a predefined classification of traffic signs, other road users, roadway markings, signaling systems or other traffic-relevant objects in the surroundings of a vehicle and/or at least one position 7b, spatial position, dimension 7c and/or speed 7d of an object of this type.

According to step 105, measured data 2 recorded with the aid of a radar device 1, whose antenna array does not enable a direct elevation measurement, may be selected. According to step 106, measured data 2 may be selected that were recorded with the aid of a moved synthetic aperture radar device.

According to block 111, generator module 4 may include an encoder 41, which translates input variables 5 into low-dimensional latent variables 5*, as well as a decoder 42, which translates these latent variables 5* into output variables 6 including an again increased dimensionality.

According to block 112, two-dimensional spatial distribution 3 of the physical measured variable, which is used as input variable 5, may be divided into multiple segments 3c through 3f that are contiguous in each case. According to block 123, input variables 5 may then be processed in segmented portions 5c through 5f to particular output variables 6c through 6f that may then be combined according to block 124. In this way, a three-dimensional spatial distribution 6b of at least one sought physical measured variable is obtained.

In general, the output variables of generator module 4 may include a three-dimensional spatial distribution of at least one sought physical measured variable according to block 122. According to block 125, generator module 4 may output multiple two-dimensional spatial distributions 6g through 6j in this case. Each of these distributions 6g through 6j then corresponds to an area of elevation angles, from which that portion of the radar radiation that generated particular distribution 6g through 6j, was reflected to radar device 1.

Figure 2:
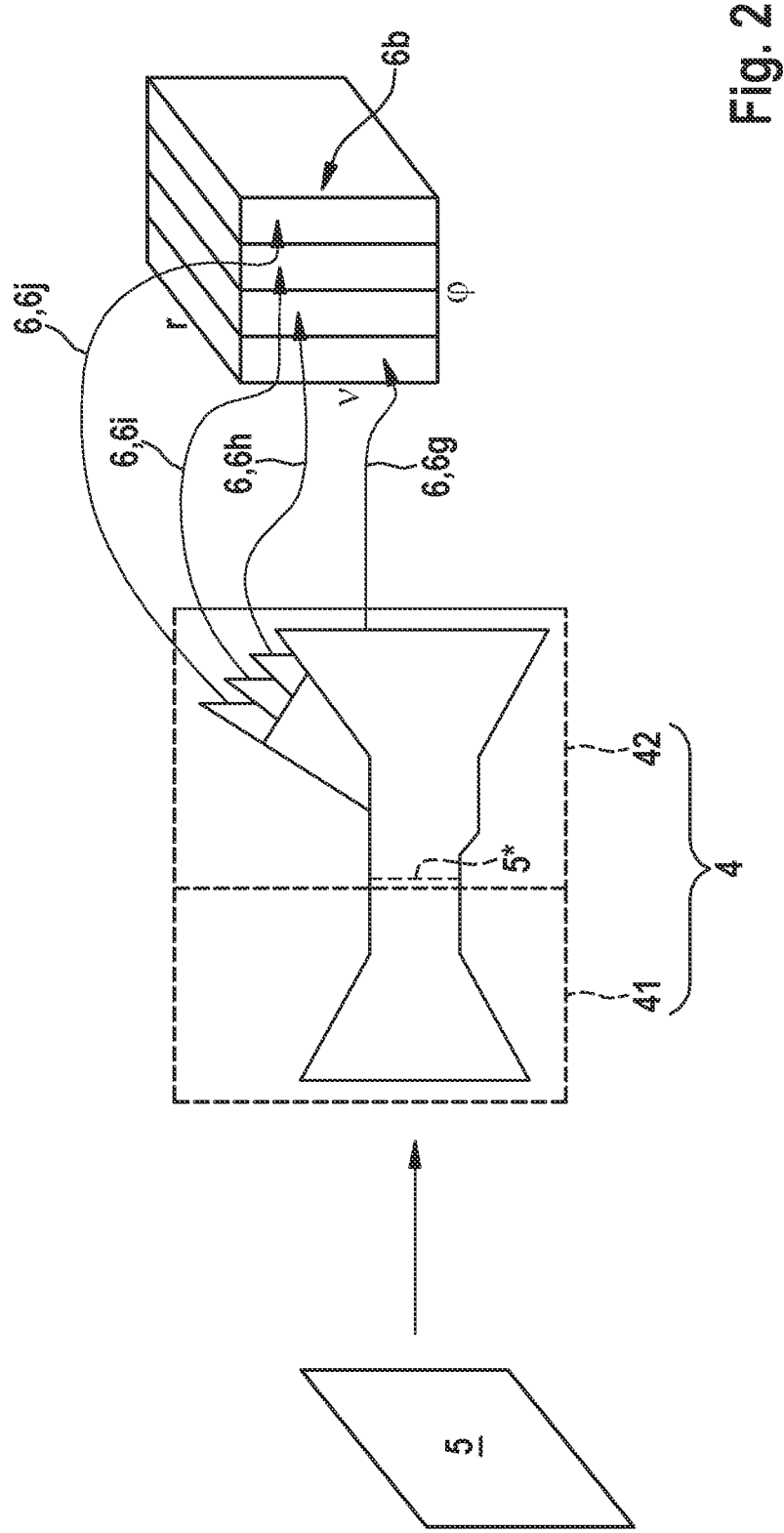
FIG. 2 shows an illustration of combining multiple two-dimensional distributions 6g through 6j of a reconstructed variable to a three-dimensional distribution 6b, in accordance with an example embodiment of the present invention.

It is illustrated in FIG. 2 how such distributions 6g through 6j may be combined to form a three-dimensional distribution 6b of the sought measured variable. Input variables 5 are initially fed to generator module 4 that is made up of an encoder 41 reducing the dimensionality and a decoder 42 again increasing the dimensionality. At the interface between encoder 41 and decoder 42, the data are present as latent variables 5*.

Decoder 42 outputs in the coordinates distance r and azimuth angle v for different elevation angles φ two-dimensional distributions 6g through 6j of the sought physical measured variable. These two-dimensional distributions 6g through 6j may be organically combined to form a tensor that then indicates a three-dimensional distribution 6b of the sought physical measured variable.

Figure 3:
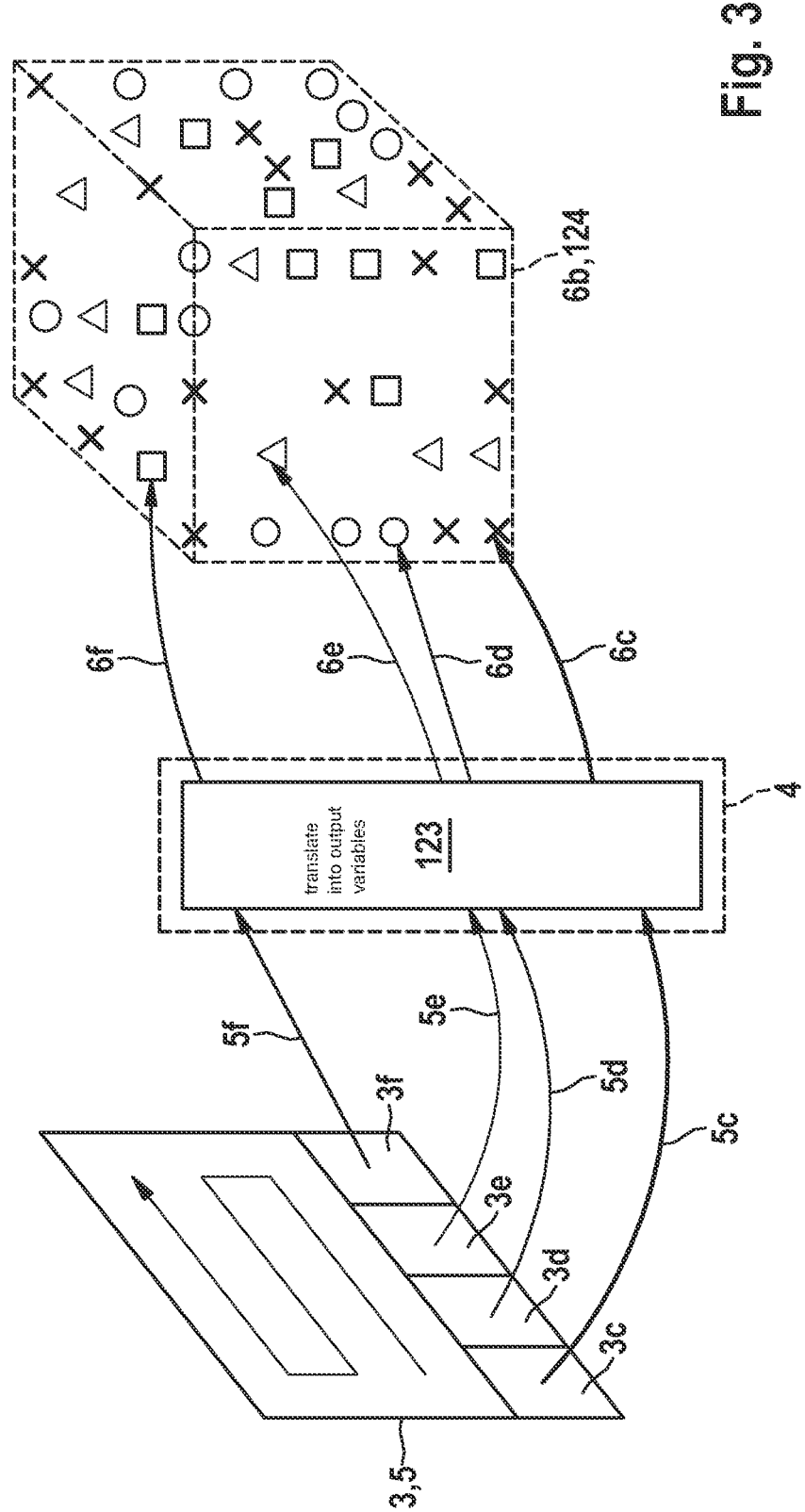
FIG. 3 shows an illustration of the segmented processing of a two-dimensional distribution 3 of a measured variable, in accordance with an example embodiment of the present invention.

FIG. 3 illustrates the segmented processing of input variable 5. Two-dimensional spatial distribution 3 of a physical measured variable embodied by measured data 2 and that is to be used as input variable 5 is divided into segments, of which four segments 3c through 3f are illustrated by way of example in FIG. 3. Input variables 5c through 5f that belong to each segment 3c through 3f are translated into output variables 6c through 6f according to block 123. Generator module 4 used for this purpose may have smaller dimensions than one that translates present input variables 5 into output variables 6 all at once.

According to block 124, output variables 6c through 6f are combined to form three-dimensional distribution 6b of the sought physical measured variable. As illustrated in FIG. 3, output variables 6c through 6f provide information on completely different locations in this three-dimensional distribution 6b. Not even all locations, regarding which an individual portion 6c through 6f of output variables 6 makes a statement, must be in a contiguous segment.

Figure 4:
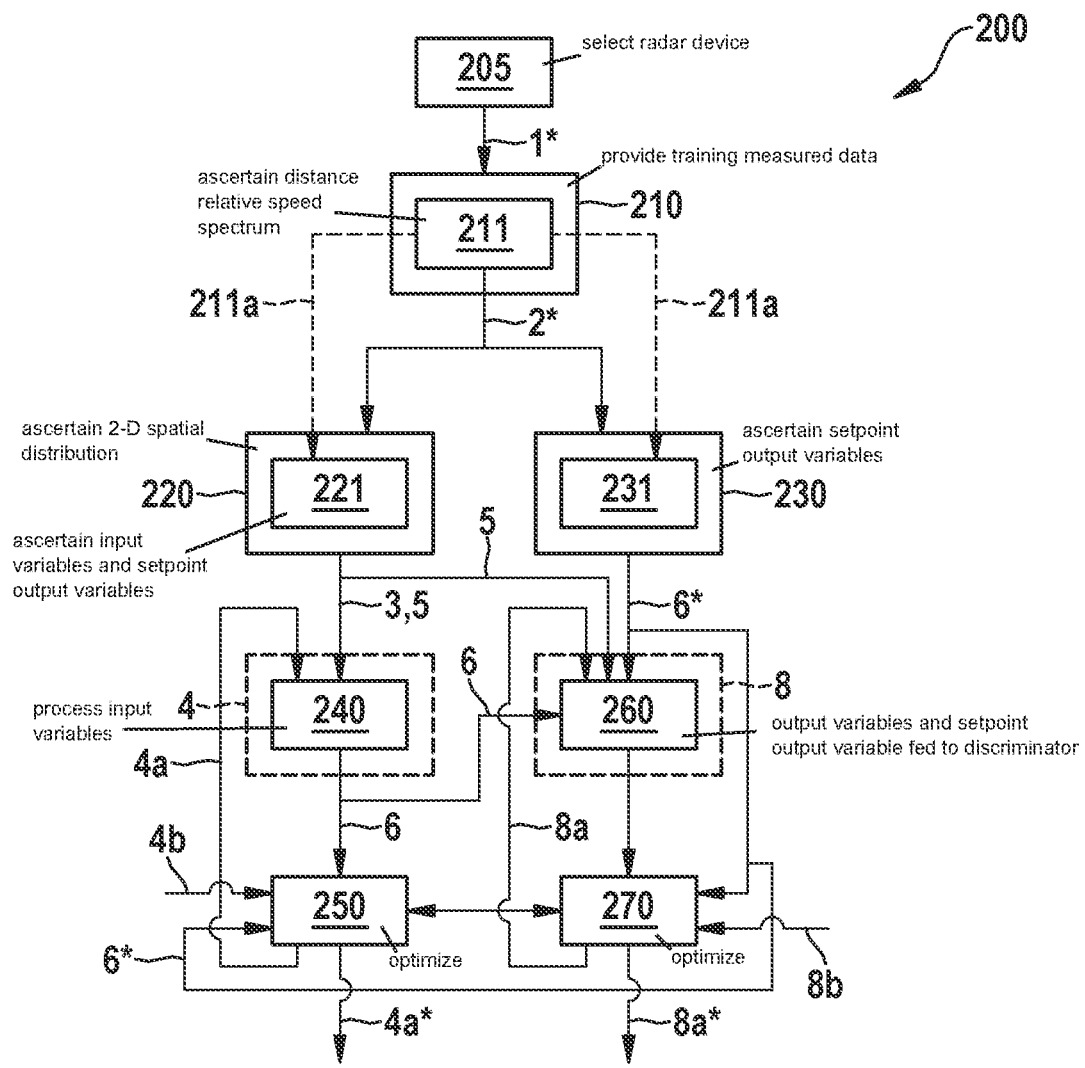
FIG. 4 shows one exemplary embodiment of method 200 for training a generator 4, in accordance with the present invention.

FIG. 4 is a schematic flowchart of one exemplary embodiment of method 200 for training generator module 4. In step 210, training measured data 2* are provided that were recorded with the aid of a radar device 1*. The antenna array of this radar device 1* enables a direct elevation measurement. In step 205, in particular, a radar device 1* may be selected that includes multiple channels outside of the plane, in which its azimuth angle is defined.

In step 220, a two-dimensional spatial distribution 3 of at least one physical measured variable is ascertained from training measured data 2* as input variables 5 for generator module 4. In step 230, from training measured data 2* setpoint output variables 6* are furthermore ascertained that represent a measure of the elevation angles 6a from which radar radiation was reflected to radar device 1* from at least one object.

Input variables 5 are processed in step 240 to form output variables 6 with the aid of generator module 4. Generator parameters 4a that characterize the behavior of generator module 4 are optimized in step 250 with the objective that output variables 6 reproduce setpoint output variables 6* sufficiently well in accordance with a predefined generator cost function 4b. The result of this training is fully trained state 4a* of generator parameters 4a.

In the example shown in FIG. 4, the neural network of generator module 4 is expanded to include an additional discriminator module 8 to form a conditional GAN, cGAN. Output variables 6, setpoint output variables 6*, as well as input variables 5 are additionally fed to discriminator module 8. Discriminator parameters 8a that characterize the behavior of discriminator module 8 are optimized in step 270 alternatingly with generator parameters 4a with the objective that discriminator module 8 well differentiates output variables 6 generated by generator module 4 from setpoint output variables 6* in accordance with a discriminator cost function 8b in step 260. The training provides fully trained state 8a* of discriminator parameters 8a and fully trained state 4a* of generator parameters 4a as a result.

After completing the training, however, only generator module 4, whose behavior is characterized by its fully trained parameters 4a*, is needed to evaluate real measured data 2.

According to block 211, a distance relative speed spectrum 211a of particular training measured data 2* may be ascertained for each channel. According to block 221, input variables 5 for generator module 4 as well as setpoint output variables 6* may then also be ascertained from the distance relative speed spectra according to block 231.

Figure 5:
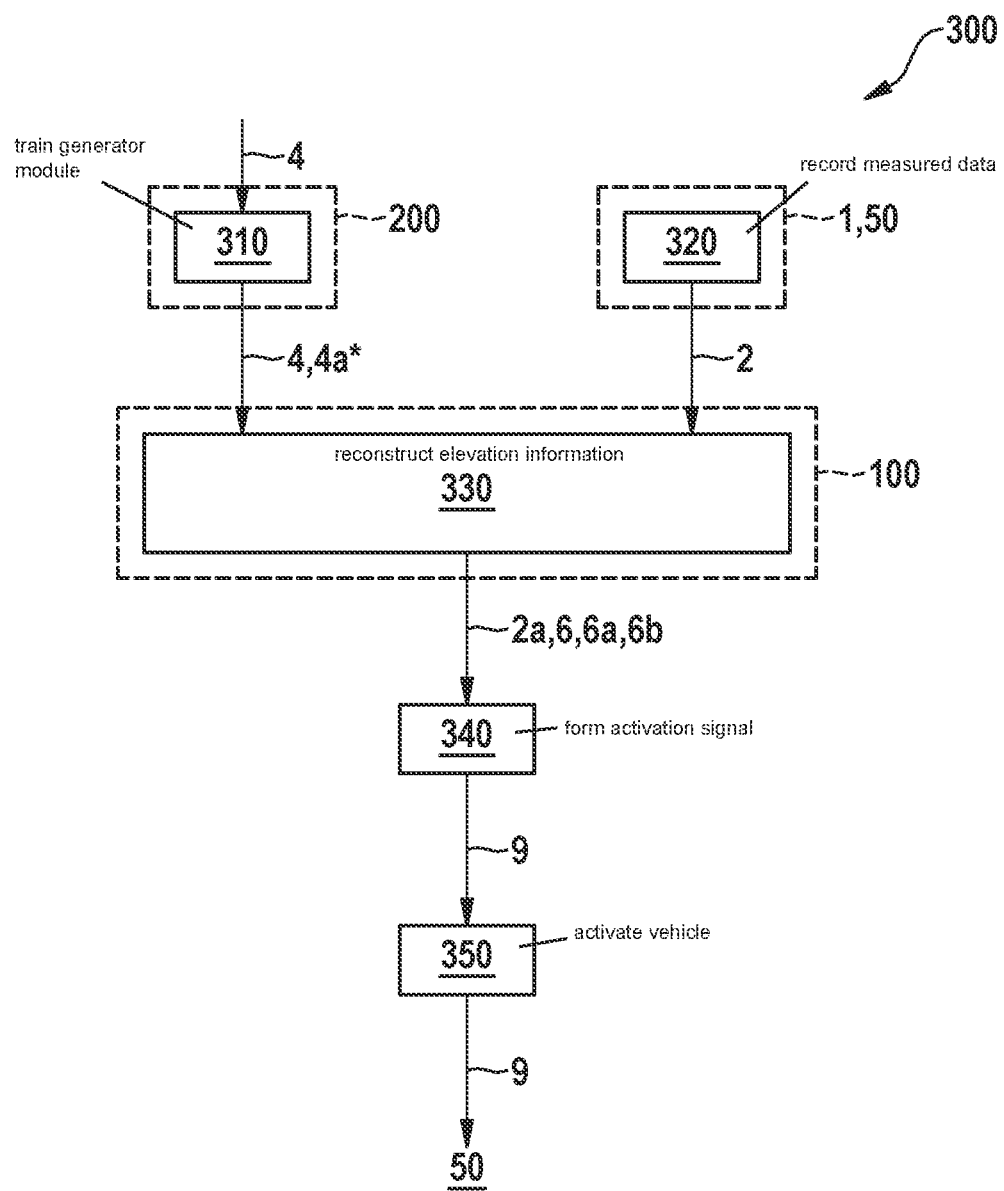
FIG. 5 shows one exemplary embodiment of method 300 including the complete active chain, in accordance with the present invention.

FIG. 5 is a schematic flowchart of one exemplary embodiment of method 300 including the complete active chain. In step 310, a generator module 4 is trained with the aid of method 200 shown in FIG. 4, resulting in that its parameters 4a assume their fully trained state 4a*. In step 320, measured data 2 from the surroundings of vehicle 50 are recorded with the aid of at least one radar device 1 that is mounted at or in a vehicle 50.

In step 330, elevation information 2a is reconstructed from measured data 2 with the aid of method 100 shown in FIG. 1 in the form of output variables 6 of used generator module 4, for example in the form of elevation angles 6a and/or a three-dimensional distribution 6b of a sought physical measured variable. The latter is used to form an activation signal 9 in step 340. In step 350, vehicle 50 is activated using this activation signal 9.

What is claimed is:

1. A method for a vehicle, the method comprising the following steps:
   during a drive of the vehicle:
     recording with at least one radar device of the vehicle, radar data that form a two-dimensional spatial distribution of at least one physical measured variable;
     feeding the radar data as input values to at least one generator module of the vehicle that is configured as a neural network and generating, from the input values, surroundings output values that represent elevation angles from which radar radiation was reflected to the radar device from at least one object;
     generating, by the vehicle, a representation of surroundings of the vehicle based on the surroundings output values; and
     performing, by the vehicle, an automated drive control of the vehicle according to the representation of surroundings;
   wherein the method includes at least one of the following two features (I)-(II):
     (I) (i) the feeding of the radar data includes dividing the input values into a plurality of segments, each of the segments formed of a respective contiguous portion of the input values, (ii) the generating of the surroundings output values includes separately processing each of the segments to obtain a respective set of segment output values and forming from the respective sets of segment output values, the surroundings output values as a single contiguous three-dimensional distribution, and (iii) with respect to each segment of at least two of the plurality of segments, representations of the segment output values of the respective segment are interspersed amongst the representations of the segment output values of one or more other ones of the segments, and are therefore non-contiguous, within the single contiguous three-dimensional distribution; and
     (II) the generating of the surroundings output values includes (i) generating a plurality of two-dimensional spatial distributions, with respect to a predefined coordinate space, of the at least one physical measured variable, each of the plurality of two-dimensional spatial distributions corresponding to a respective elevation region, and (ii) stacking the plurality of two-dimensional spatial distributions to form a contiguous three-dimensional distribution spanning the respective elevation regions of the plurality of two-dimensional spatial distributions.

2. The method as recited in claim 1, wherein the surroundings output values indicate, with regard to locations in the two-dimensional spatial distribution, from which elevation angles radar radiation that contributed to a value of a physical measured variable at each location was reflected to the radar device.

3. The method as recited in claim 1, wherein the generator module includes:
an encoder configured to translate the input values into latent variables in a space, whose dimensionality is smaller than a dimensionality of a space of the input values and smaller than a dimensionality of a space of the surroundings output values; and
a decoder configured to translate the latent variables into the surroundings output values.

4. The method as recited in claim 1, wherein:
the antenna array of the at least one radar device is arranged within a single elevation range such that, without use of the generator module, the antenna array is capable of performing measurements of only the single elevation range; and
information of one or more elevations outside of the single elevation range is obtainable using the generator module.

5. The method as recited in 1, wherein the at least one radar device is a moved synthetic aperture radar device.

6. The method as recited in claim 1, wherein the generating of the representation of the surroundings includes evaluating:
at least one category of a predefined classification of traffic signs, or other road users, or roadway markings, or signaling systems, or other traffic-relevant objects, in surroundings of a vehicle, and/or
at least one position, and/or spatial measurement and/or speed of an object including a traffic sign, or other road user, or roadway marking, or signaling system, or another traffic-relevant object, in the surroundings of a vehicle.

7. The method as recited in claim 1, further comprising training the generator module by:
providing training measured radar data;
ascertaining a two-dimensional spatial distribution of the at least one physical measured variable from the training measured radar data;
ascertaining setpoint output values from the training measured radar data that represent a measure of elevation angles from which radar radiation was reflected back to the radar device from at least one object;
processing the training measured radar data to form a generator module version of output values using the generator module; and
optimizing generator parameters that characterize a behavior of the generator module to maximize a degree to which the generator module version of the output values reproduce the setpoint output values in accordance with a predefined generator cost function.

8. The method as recited in claim 7, wherein the training of the generator module further includes:
feeding the generator module version of the output values and the setpoint output values to a discriminator module that is configured as a further neural network; and
optimizing discriminator parameters that characterize a behavior of the discriminator module alternatingly with the generator parameters for optimizing a differentiation performed by the discriminator module to differentiate the generator module version of the output values from the setpoint output values in accordance with a discriminator cost function.

9. The method as recited in claim 7, wherein the radar device includes multiple channels outside of a plane in which its azimuth angle is defined.

10. The method as recited in claim 9, wherein a distance relative speed spectrum of the training measured radar data is ascertained for each of the multiple channels and, during the training, input for the generator module and the setpoint output values are ascertained from the distance relative speed spectra.

11. The method as recited in claim 1, wherein:
(i) the feeding of the radar data includes the dividing the input values into the plurality of segments, each of the segments formed of the respective contiguous portion of the input values;
(ii) the generating of the surroundings output values includes the separately processing of each of the segments to obtain the respective set of segment output values and the forming, from the respective sets of segment output values, the surroundings output values as the single contiguous three-dimensional distribution; and
(iii) with respect to each segment of the at least two of the plurality of segments, the representations of the segment output values of the respective segment are interspersed amongst the representations of the segment output values of the one or more other ones of the segments, and are therefore non-contiguous, within the single contiguous three-dimensional distribution.

12. The method as recited in claim 11, wherein the at least one generator module includes a plurality of generator modules executing on different processors, by which execution the plurality of generator modules process the plurality of segments in parallel.

13. The method as recited in claim 1, wherein the generating of the surroundings output values includes:
(i) the generating of the plurality of two-dimensional spatial distributions, with respect to the predefined coordinate space, of the at least one physical measured variable, each of the plurality of two-dimensional spatial distributions corresponding to the respective elevation region; and
(ii) the stacking of the plurality of two-dimensional spatial distributions to form the contiguous three-dimensional distribution spanning the respective elevation regions of the plurality of two-dimensional spatial distributions.

14. A non-transitory machine-readable data carrier on which are stored machine-readable instructions that are executable by a computer system of a vehicle and that, when executed by the computer system, causes the computer system to perform the following steps:
during a drive of the vehicle:
obtaining, as input values and by a generator module that is configured as a neural network of the computer system, radar data recorded with at least one radar device of the vehicle and that form a two-dimensional spatial distribution of at least one physical measured variable;
generating, by the generator module, surroundings output values that represent elevation angles from which radar radiation was reflected to the radar device from at least one object;
generating, by the computer system, a representation of surroundings of the vehicle based on the surroundings output values; and performing, by the computer system, an automated drive control of the vehicle according to the representation of surroundings;

wherein the machine-readable data carrier includes at least one of the following two features (I)-(II):

(I) (i) the instructions cause the computer system to divide the input values into a plurality of segments, each of the segments formed of a respective contiguous portion of the input values, (ii) the generating of the surroundings output values includes separately processing each of the segments to obtain a respective set of segment output values and forming, from the respective sets of segment output values, the surroundings output values as a single contiguous three-dimensional distribution, and (iii) with respect to each segment of at least two of the plurality of segments, representations of the segment output values of the respective segment are interspersed amongst the representations of the segment output values of one or more other ones of the segments, and are therefore non-contiguous, within the single contiguous three-dimensional distribution; and (II) the generating of the surroundings output values includes (i) generating a plurality of two-dimensional spatial distributions, with respect to a predefined coordinate space, of the at least one physical measured variable, each of the plurality of two-dimensional spatial distributions corresponding to a respective elevation region, and (ii) stacking the plurality of two-dimensional spatial distributions to form a contiguous three-dimensional distribution spanning the respective elevation regions of the plurality of two-dimensional spatial distributions.

15. The non-transitory machine-readable data carrier as recited in claim 14, wherein the stored machine-readable instructions further cause the computer system to train the generator module by:

providing training measured radar data;
ascertaining a two-dimensional spatial distribution of the at least one physical measured variable from the training measured radar data;
ascertaining setpoint output values from the training measured radar data that represent a measure of elevation angles from which radar radiation was reflected back to the radar device from at least one object;
processing the training measured radar data to form a generator module version of output values using the generator module; and
optimizing generator parameters that characterize a behavior of the generator module to maximize a degree to which the generator module version of the output values reproduce the setpoint output values in accordance with a predefined generator cost function.

16. A computer system of a vehicle, the computer system configured to:

during a drive of the vehicle:
obtain, as input values and by a generator module that is configured as a neural network of the computer system, radar data recorded with at least one radar device of the vehicle and that form a two-dimensional spatial distribution of at least one physical measured variable;
generate, by the generator module, surroundings output values that represent elevation angles from which radar radiation was reflected to the radar device from at least one object;
generate a representation of surroundings of the vehicle based on the surroundings output values; and
perform an automated drive control of the vehicle according to the representation of surroundings;

wherein the computer system includes at least one of the following two features (I)-(II):

(I) (i) the computer system is configured to divide the input values into a plurality of segments, each of the segments formed of a respective contiguous portion of the input values, (ii) the generating of the surroundings output values includes separately processing each of the segments to obtain a respective set of segment output values and forming from the respective sets of segment output values, the surroundings output values as a single contiguous three-dimensional distribution, and (iii) with respect to each segment of at least two of the plurality of segments, representations of the segment output values of the respective segment are interspersed amongst the representations of the segment output values of one or more other ones of the segments, and are therefore non-contiguous, within the single contiguous three-dimensional distribution; and (II) the generation of the surroundings output values includes (i) generating a plurality of two-dimensional spatial distributions, with respect to a predefined coordinate space, of the at least one physical measured variable, each of the plurality of two-dimensional spatial distributions corresponding to a respective elevation region, and (ii) stacking the plurality of two-dimensional spatial distributions to form a contiguous three-dimensional distribution spanning the respective elevation regions of the plurality of two-dimensional spatial distributions.

* * * * *